R. J. HAMILTON.
TRIP COUPLING.
APPLICATION FILED OCT. 7, 1910.
1,038,356.
Patented Sept. 10, 1912.
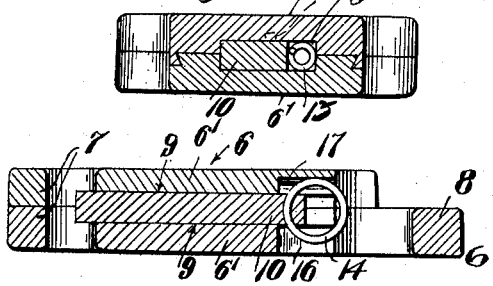
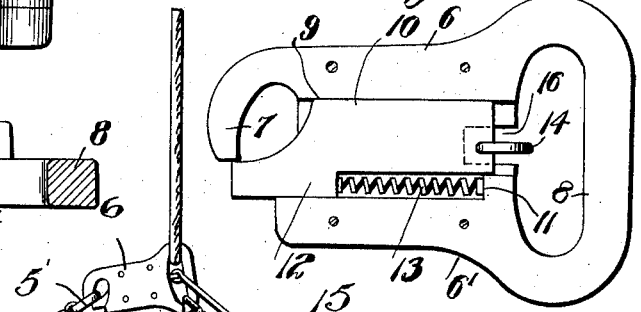
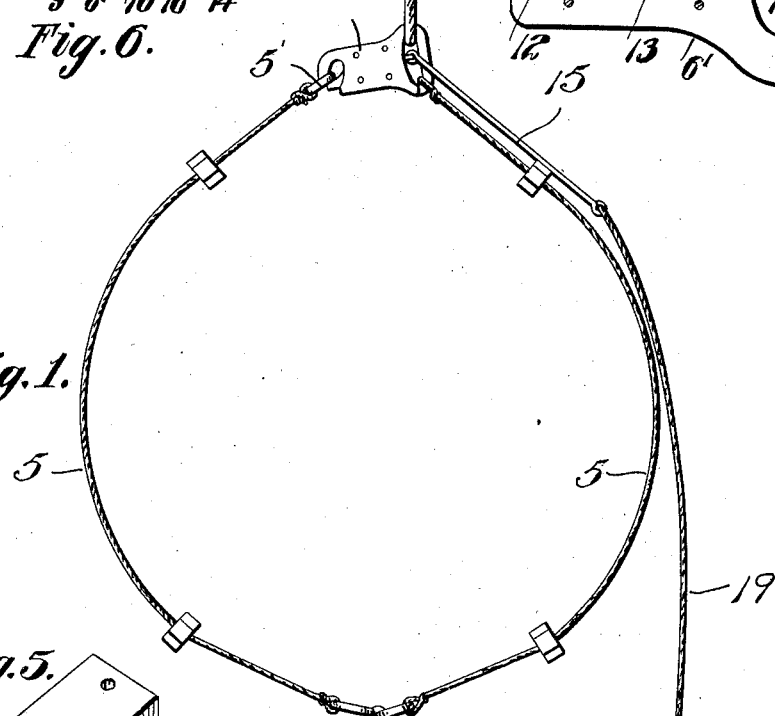
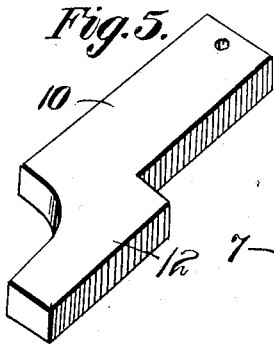
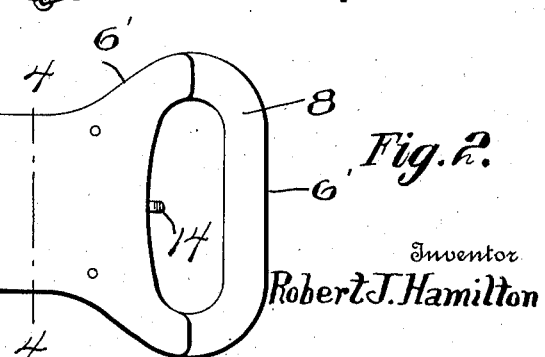
Witnesses
E. E. Johansen.
Geo. W. Dorr.
Inventor
Robert J. Hamilton
By Harry E. Chandlee
Attorney

UNITED STATES PATENT OFFICE.

ROBERT J. HAMILTON, OF BROWNING, MONTANA.

TRIP-COUPLING.

1,038,356.

Specification of Letters Patent.  Patented Sept. 10, 1912.

Application filed October 7, 1910. Serial No. 585,838.

*To all whom it may concern:*

Be it known that I, ROBERT J. HAMILTON, a citizen of the United States, residing at Browning, in the county of Teton and State of Montana, have invented certain new and useful Improvements in Trip-Couplings, of which the following is a specification.

This invention relates to new and useful improvements in trip couplings, and more particularly to a coupling which is designed to be used in connection with hay slings and analogous devices, whereby the slings may be instantly coupled or uncoupled.

The primary object of the present invention is to produce a coupling of simple and inexpensive construction and reliable action by means of which the two sling members may be instantly uncoupled when it is desired to deposit the load of hay carried thereby.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a portion of this specification, and in which like numerals of reference indicate similar parts in the several views, Figure 1 is a view of a hay sling equipped with my improved coupling, Fig. 2 is an enlarged plan view of the coupling detached from the sling, Fig. 3 is a similar view, one of the sections of the casing being removed, Fig. 4 is a section taken on the line 4—4 of Fig. 2, Fig. 5 is a detail perspective view of the locking bolt.

Referring to the drawings, 5 indicates a hay sling which may be of any approved construction, the two sections of which are provided at their inner ends with suitable means for connection to the coupling member 6. As shown in the drawings one of the hay slings is provided with a plurality of cords which are permanently secured in one end of the coupling, the other sling being provided with a ring or link 5′ which is adapted to attach to the opposite end of the coupling member.

The coupling 6 comprises the two casing sections 6′, which are formed upon one of their ends with a hook 7 which extends approximately one-half of the width of the casings. The opposite end of one of the sections is formed with an integral connecting bar or link 8. Each of the sections have their opposed faces grooved or recessed as shown at 9. Between the sections and in the grooves 9 a sliding locking bolt 10 is disposed and is adapted to coengage with the outer hooked ends of the sections to couple the sections of the hay sling when it is desired to load or stack hay or other grain. The grooves 9 are formed at their rear ends with an inwardly projecting shoulder 11, contracting the width of the grooves at this point, and providing a guide for the locking bolt. The forward end of the bolt 10 is formed with a lateral enlargement 12, which is of the same width as the shoulders 11. Between the shoulders 11 and the enlargement 12, a spring 13 is positioned, and normally tends to retain the forward end of the locking bolt in engagement with the hook 7.

It will be noted that the forward extremity of the bolt is a continuation of the enlarged portion 12 thereof, and does not extend the entire width of the bolt. In the rear end of the bolt a link 14 is secured to which one end of a rod 15 is attached. This link moves inwardly with the bolt, and the rod 15 is movable in a longitudinal recess 16 provided in the lower casing section. The other of the sections is provided with a channel groove 17 in which the link 14 is received during the inward movement of the rear end of the locking bolt. The casing sections are secured together in any desired manner, as by screws or rivets, or as shown in the drawings the sections may be provided with mortises and tenons whereby the casing sections may be securely held against all possibility of accidental disengagement.

In operation, one of the hay slings is permanently secured to the bar or link 8, and the ring 5 of the other of the sling sections is engaged in the hooked end 7 of the coupling, the locking bolt having been retracted within the grooves 9 formed in the casing sections of the coupling.

Upon the release of the locking bolt, the spring 13 will force the same outwardly into engagement with the hook 7, and securely lock the ring 5′ within the hook, thus connecting the two sections of the sling. The lower end of the rod 15 may be provided with a rope or pull cord 19, by means of which the coupling may be operated to release the load carried by the sling at a considerable distance from the point of operation.

From the foregoing it will be seen that I have provided a trip coupling which while extremely simple in its construction is instantaneous in its operation and the sections of the sling may be very quickly connected and disconnected.

By forming the casing sections as above described, the maximum amount of strength and durability is secured, and it will be understood that the spring 13 may be made of the required tension whereby the device may be adapted to various uses. As the various parts are all of simple formation, it will be obvious that the device may be very inexpensively manufactured, while at the same time a high degree of efficiency is obtained.

What is claimed is:

A trip coupling comprising a pair of casings, each having a hook at one end extending inwardly and having slots formed in their meeting faces and extending longitudinally therein, the hooks curving across the casings, the casings being formed at the rear with inwardly extending shoulders reducing the width of the slot, a spring mounted in the slot and bearing against the shoulders, and a bolt having a reduced portion slidably mounted in the reduced portion of the slots and having an enlarged portion providing a shoulder against which the other end of the spring bears, whereby when the bolt and spring are introduced into the slot of one of the casings and the other casing is secured in position on the first the two casings securely lock the bolt and spring therebetween and prevent removal thereof, one of the casings having an attaching loop formed thereon, and an operating rod secured to the bolt and projecting rearwardly in the plane of the other casing to exert a direct rearward pull to draw the bolt into the casing.

In testimony whereof I affix my signature, in presence of two witnesses.

ROBERT J. HAMILTON.

Witnesses:
 W. C. BROADWATER,
 GUY CRANDALL.

Copies of this patent may be obtained for five cents each, by addressing the "Commissioner of Patents, Washington, D. C."